United States Patent
Aharonian et al.

(10) Patent No.: US 7,275,169 B2
(45) Date of Patent: Sep. 25, 2007

(54) GRAPHICAL VIEW OF SHUTDOWN PROCESS

(75) Inventors: David M. Aharonian, Warwick, RI (US); David J. Smith, East Greenwich, RI (US); Todd J. Giaquinto, Cumberland, RI (US); John M. O'Leary, Newport, RI (US)

(73) Assignee: American Power Conversion Corporation, West Kingston, RI (US)

( * ) Notice: Subject to any disclaimer, the term of this patent is extended or adjusted under 35 U.S.C. 154(b) by 234 days.

(21) Appl. No.: 10/701,379

(22) Filed: Nov. 3, 2003

(65) Prior Publication Data

US 2005/0097374 A1 May 5, 2005

(51) Int. Cl.
*G06F 1/00* (2006.01)

(52) U.S. Cl. .................. 713/330; 715/771; 715/779; 715/788; 715/798; 715/799; 715/800; 715/762; 715/763; 715/764; 715/765; 715/766; 715/767

(58) Field of Classification Search ................ 713/330; 715/762–767, 771, 779, 788, 798–800
See application file for complete search history.

(56) References Cited

U.S. PATENT DOCUMENTS

| | | | | |
|---|---|---|---|---|
| 5,040,123 A | * | 8/1991 | Barber et al. | 700/100 |
| 5,717,934 A | * | 2/1998 | Pitt et al. | 713/330 |
| 5,793,124 A | * | 8/1998 | Mitzaki | 307/66 |
| 5,958,054 A | * | 9/1999 | O'Connor et al. | 713/300 |
| 6,356,284 B1 | * | 3/2002 | Manduley et al. | 713/779 |
| 6,380,953 B1 | * | 4/2002 | Mizuno | 715/764 |
| 6,438,110 B1 | * | 8/2002 | Rai et al. | 370/254 |
| 6,674,450 B1 | * | 1/2004 | Toub et al. | 715/749 |
| 6,809,724 B1 | * | 10/2004 | Shiraishi et al. | 345/169 |
| 6,854,065 B2 | * | 2/2005 | Smith et al. | 713/300 |
| 2002/0129355 A1 | * | 9/2002 | Velten et al. | 717/176 |
| 2003/0097288 A1 | * | 5/2003 | Shimomura et al. | 705/8 |
| 2003/0200130 A1 | * | 10/2003 | Kall et al. | 705/8 |

OTHER PUBLICATIONS

International Business Machines Corporation: "A Software Managing Clustered Multi Vender Uninterruptible Power Supply on Network," Research Disclosure, http://www.researchdisclosure.com/, Research Disclosure Database No. 419103, Mar. 1999.*

(Continued)

*Primary Examiner*—Rehana Perveen
*Assistant Examiner*—James F. Sugent
(74) *Attorney, Agent, or Firm*—Lowrie, Lando & Anastasi, LLP.

(57) ABSTRACT

A method of controlling shutdown of processes on equipment powered through a UPS comprises: providing a graphical display system and a graphical pointing device; displaying on the graphical display system a graphic having a time access and a process access; arranging along the process access indicia of one or more processes to be shutdown; for at least one of the one or more processes, displaying a time bar extending from a start point along the time access to an end point along the time access; and controlling one of the start point and the end point of the time bar with the pointing device, whereby shutdown of the at least one process is controlled according to the times of the start point and the end point of the time bar.

13 Claims, 8 Drawing Sheets

OTHER PUBLICATIONS

Alford Jr, J.A.: "Time Line Interface for Scheduled Maintenance Activities," IBM Technical Disclosure Bulletin, vol. 37, No. 02A, Feb. 1994.*

Marmel, Elaine J.: "Microsoft Project 2000 Bible," IDG Books Worldwide, Inc., 2000, Ch. 2.*

* cited by examiner

GRAPHICAL VIEW OF SHUTDOWN PROCESS

BACKGROUND OF INVENTION

The invention relates generally to control systems for power supply devices, and more particularly, to software control systems used in connection with an Uninterruptitible Power Supply (UPS) system.

There are numerous types of Uninterruptible Power Supply (UPS) systems for supplying backup alternating current (AC) or direct current (DC) power to electrical loads. These UPS systems generally use batteries or types of other energy storage devices that supply such power when a main power supply (e.g., line power) is not available. For example, backup power is provided when power from an AC source performs outside acceptable limits or fails altogether. These UPS systems are controlled by computer systems including hardware and software components.

These UPS systems generally use one or more energy storage devices configured to provide backup power for a definite, finite period of time determined by the capacity of the energy storage device or devices and the magnitude of the load, that is, the amount of power consumed over time by equipment whose power requirements are met by the UPS. These UPS systems allow normal system operation to proceed for some period of time, but then control software in the UPS system and associated UPS system hardware begins to force the equipment whose power they are supplying to shutdown in a controlled manner before the capacity of the UPS is reached. Because different UPS applications have different requirements with respect to system availability, system reliability, robustness of the shutdown process, etc., it is desirable to tailor the shutdown of each process running on equipment powered by the UPS to meet various requirements. Also, some processes (e.g., a database manager running on a computer) must shutdown before others (e.g., the operating system on the computer). Such UPS systems accurately estimate a remaining time period that the UPS system can supply backup power. All of the shutdown processes must complete within the estimated time to avoid data loss or other problems.

Conventional software control systems used to configure the shutdown process of UPS systems such as described above employ a tabular user interface for configuring the shutdown parameters corresponding to each process running on each piece of equipment whose power is supplied by the UPS system. The table is displayed to an operator on a computer display device, allowing the operator to enter into the displayed table processes whose shutdown is to be controlled, along with desired shutdown parameters. Changes to parameters are made as changes to text entries in the table.

The table may be generally configured to have a list of processes along the left edge, followed by columns for setting process shutdown start and end times. The times made be stated relative to beginning of the shutdown process, and may be stated as delay and duration values, rather then start and end times, if desired.

Configuring the shutdown process using the conventional user interface can be a difficult and confusing one for some UPS operators. In some situations, the tabular format does not make as clear to the operator as may be desired, the ramifications of various changes. Operators may be left without a full understanding of when processes would begin to shutdown or conclude shutting down, when computer operating systems would shutdown and when the UPS system itself would turn off or enter a hibernation mode.

SUMMARY OF INVENTION

According to various aspects of embodiments of the invention improvements to controlling Uninterruptible Power Supply (UPS) are provided.

According to one aspect of one embodiment of the invention, a method of controlling shutdown of processes on equipment powered through a UPS comprises: providing a graphical display system and a graphical pointing device; displaying on the graphical display system a graphic having a time access and a process access; arranging along the process access indicia of one or more processes to be shutdown; for at least one of the one or more processes, displaying a time bar extending from a start point along the time access to an end point along the time access; and controlling one of the start point and the end point of the time bar with the pointing device, whereby shutdown of the at least one process is controlled according to the times of the start point and the end point of the time bar.

BRIEF DESCRIPTION OF DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings, in which like reference designations indicate like elements.

DETAILED DESCRIPTION

Figure 1:
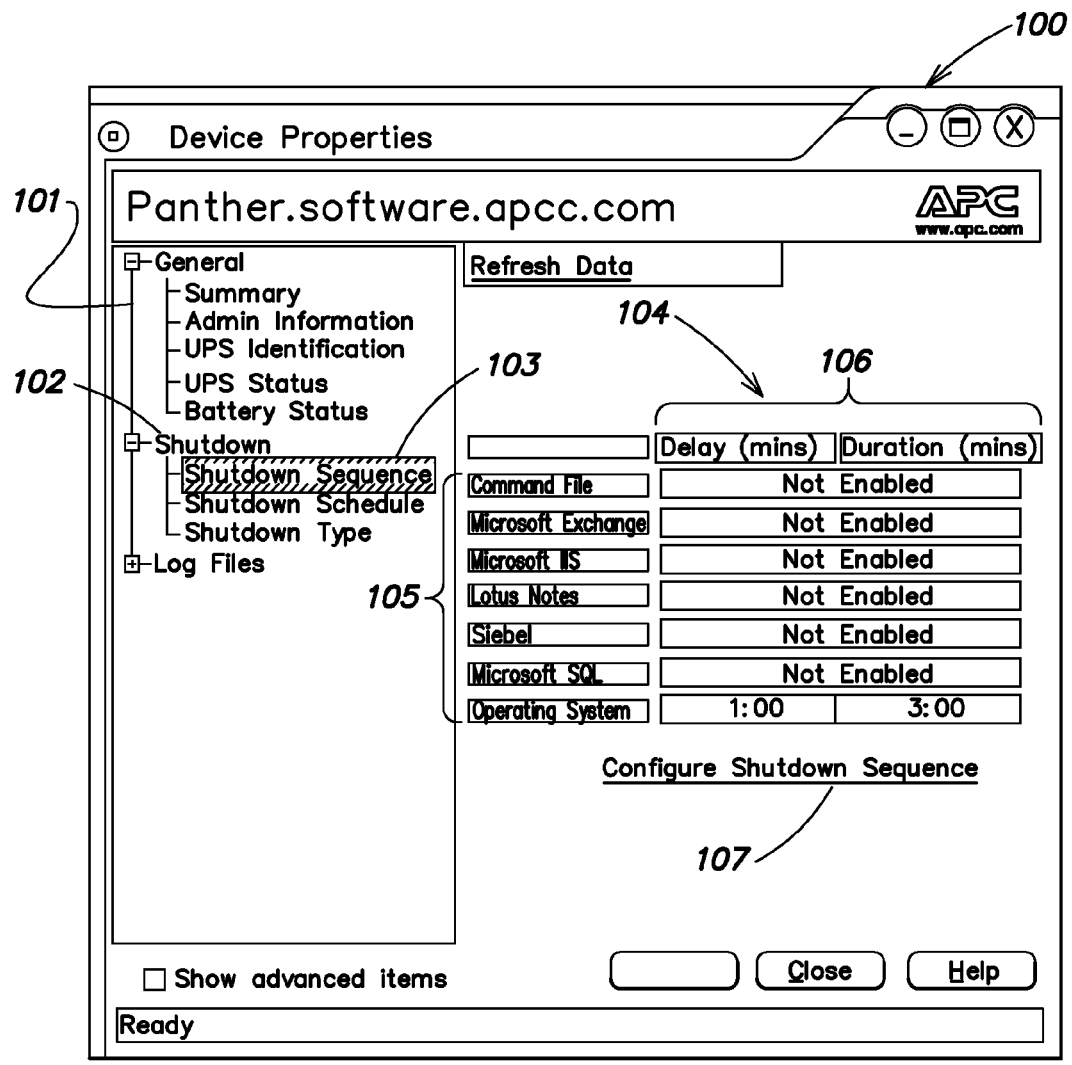
FIG. 1 is a screen shot of a device property window for a user interface incorporated aspects of the embodiments of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

According to aspects of embodiments of the invention, an operator of an Uninterruptible Power Supply (UPS) system views a graphical timeline of a shutdown process and configures the shutdown process using the graphical view. After an initial screen that summarizes, substantially in the conventional manner, the start and end times for: shutdown of various processes under UPS control, execution of a command file under UPS control, and shutdown of the operating system; a wizard may be invoked that includes graphical tools for configuring the shutdown process. At least one graphical screen shows actually when various portions of the shutdown process occur. The graphical screen also includes tools for allowing an operator to make modifications to the shutdown process by various graphical means. Optionally, the graphical display can indicate impermissible configurations or prevent an operator from requesting such impermissible configurations.

Various aspects of embodiments of the invention may be implemented on one or more computer systems controlling a UPS and/or the equipment powered by a UPS. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system or processor may be used to control a UPS system, the equipment powered by the UPS system, and the shutdown of such systems, according to various embodiments of the invention. Further, the shutdown control system may be located on a single computer or may be distributed among a plurality of computers attached by a communications network.

A general-purpose computer system either integrated with or connected for communication with the UPS system according to aspects of one embodiment of the invention is configured to perform any of the described shutdown functions including but not limited to displaying user interface elements and receiving inputs from an operator. It should be appreciated that the system may perform other functions, including network communication, and the invention is not limited to having any particular function or set of functions.

Figure 7:
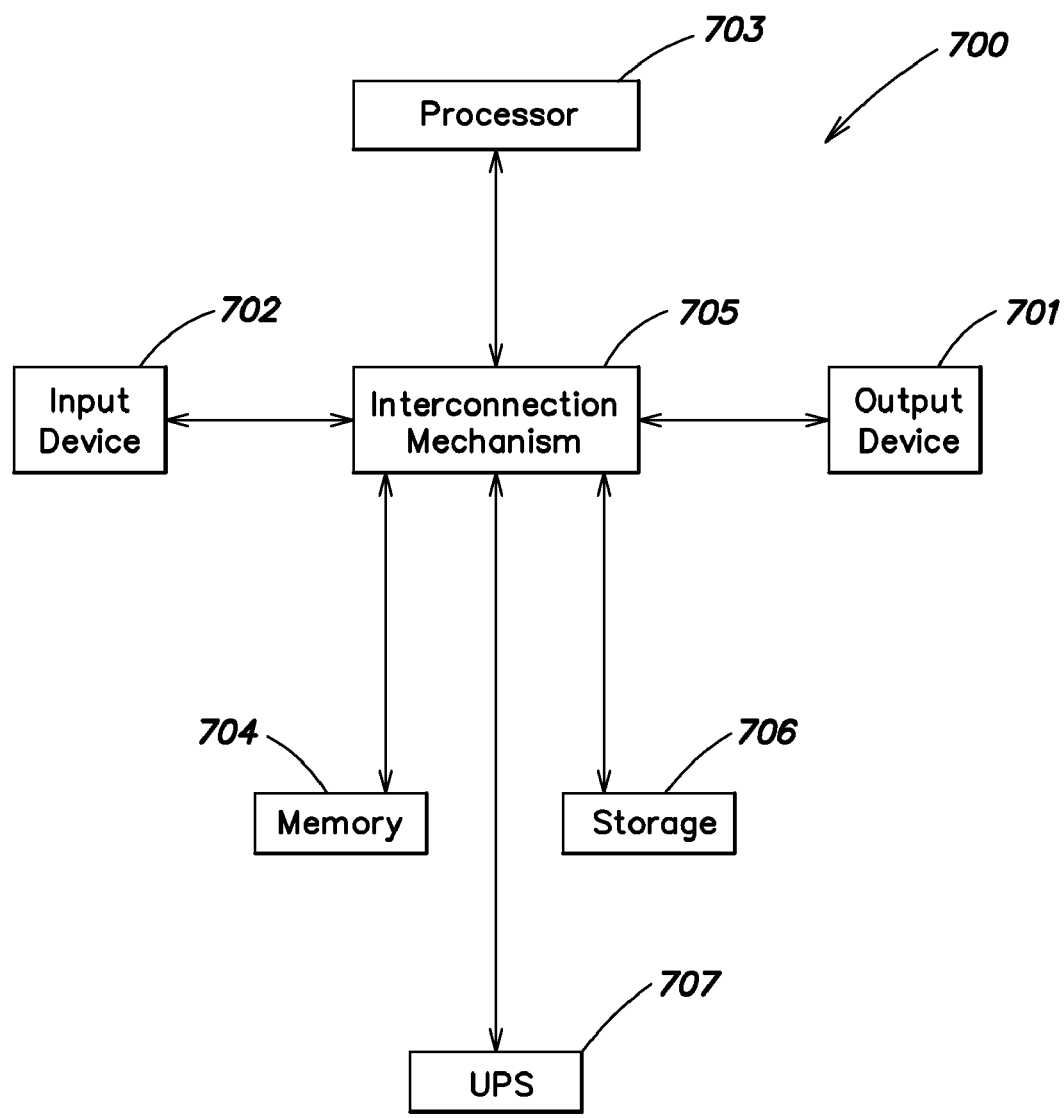
FIG. 7 is a schematic block diagram of a computing system.

For example, various aspects of the invention may be implemented as specialized software executing in a general-purpose computer system 700 such as that shown in FIG. 7. The computer system 700 may include a processor 703 connected to one or more memory devices 704 and one or more storage systems 706, each of which may include a disk drive, memory, or other device for storing data. Memory 704 is typically used for storing programs and data during operation of the computer system 700, while storage system 706 is typically used for storing programs and data non-volatilely when they are not in use. Components of computer system 700 may be coupled by an interconnection mechanism 705, which may include one or more busses (e.g., between components that are integrated within a same machine) and/or a network (e.g., between components that reside on separate discrete machines). The interconnection mechanism 705 enables communications (e.g., data, instructions) to be exchanged between system components of system 700.

Computer system 700 also includes one or more input devices 702, for example, a keyboard, mouse, trackball, microphone, touch screen, and one or more output devices 701, for example, a printing device, display screen, speaker. In addition, computer system 700 may contain one or more interfaces (not shown) that connect computer system 700 to a communication network (in addition or as an alternative to the interconnection mechanism 705.

Computer system 700 may include UPS hardware 707, or UPS hardware 707 may stand alone from computer system 700. However, UPS hardware 707 communicates with system 700 through the interconnection mechanism 705.

Figure 8:
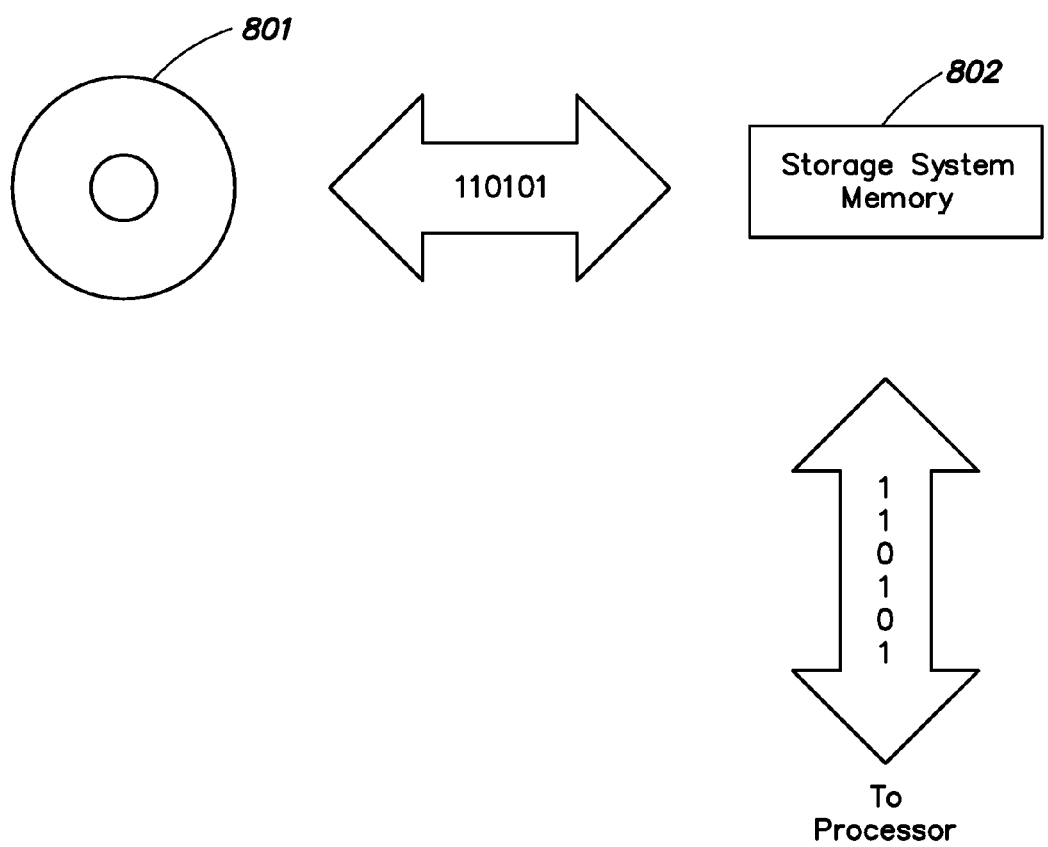
FIG. 8 is a schematic block diagram of a storage subsystem of the computing system of FIG. 7.

The storage system 706, shown in greater detail in FIG. 8, typically includes a computer readable and writeable nonvolatile recording medium 801 in which signals are stored that define a program to be executed by the processor or information stored on or in the medium 801 to be processed by the program. The medium may, for example, be a disk or flash memory. Typically, in operation, the processor causes data to be read from the nonvolatile recording medium 801 into another memory 802 that allows for faster access to the information by the processor than does the medium 801. This memory 802 is typically a volatile, random access memory such as a dynamic random access memory (DRAM) or static memory (SRAM). It may be located in storage system 706, as shown, or in memory system 704, not shown. The processor 703 generally manipulates the data within the integrated circuit memory 704, 802 and then copies the data to the medium 801 after processing is completed. A variety of mechanisms are known for managing data movement between the medium 801 and the integrated circuit memory element 704, 802, and the invention is not limited thereto. The invention is not limited to a particular memory system 704 or storage system 706.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 700 is shown by way of example as one type of computer system upon which various aspects of the invention may be practiced, it should be appreciated that aspects of the invention are not limited to being implemented on the computer system as shown in FIG. 7. Various aspects of the invention may be practiced on one or more computers having a different architecture or components that that shown in FIG. 7.

Computer system 700 may be a general-purpose computer system that is programmable using a high-level computer programming language. Computer system 700 may be also implemented using specially programmed, special purpose hardware. In computer system 700, processor 703 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X operating system available from Apple Computer, the Solaris operating system available from Sun Microsystems, or UNIX operating systems available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Next, aspects of embodiment of the invention are further described in connection with FIGS. 1-6, which illustrate also a method of configuring a UPS system for shutdown.

Aspects of this exemplary embodiment include software modules executing on a computer under control of a Microsoft Windows operating system. Such software modules may be distributed by any suitable means, such as on removable media, as signals transmitted over a network, or as firmware embedded in a hardware embodiment, for example.

A Device Properties window displayed by the exemplary UPS control software is used to control characteristics of the UPS device attached to, or into which, the computer is integrated. Of course, other partitions of the software, special purpose software, other operating systems, etc. are also suitable, as well be understood by the skilled artisan.

The Device Properties window 100 illustrated in FIG. 1 includes two main sections. On the left is a graphical tree structure 101 showing the various configuration sections of a device control software system for controlling a UPS. On the main heading "Shutdown" 102 is a selection "Shutdown Sequence" 103, which has been selected. The right hand section of this window displays information which depends on the subsection selected in the left hand section of the window. Since "Shutdown Sequence" was selected, the right section shows a table 104 of processes 105 detected by the exemplary UPS control software and which are to be either run as part of a shutdown sequence, or which are to be shutdown. The right section also displays configuration information 106 for each of these processes 105. FIG. 1 illustrates the default configuration, prior to adjustment by an operator.

In the illustrated application, the exemplary UPS control software has detected processes running on equipment controlled by the UPS including a Microsoft Exchange server, Microsoft IIS, a Lotus Notes server, Siebel, a Microsoft SQL server and an Operating System (OS). In addition, a Command File for execution during shutdown has also been detected. As indicated adjacent the process names along the left side of the table 104, except for the Operating System, shutdown sequences commanded by the UPS are not enabled for any of the processes. The Operating System is scheduled to shutdown one minute after commencement of the shutdown sequence, and shutdown of the OS is scheduled to have duration of three minutes.

Left configured as shown, this system would exhibit extremely undesirable characteristics because the operating system would be shutdown, while processes capable of modifying system data, e.g., the Microsoft Exchange server, are not properly shutdown. Therefore, an operator would next click the link below the table, labeled "Configure Shutdown Sequence" 107.

Figure 2:
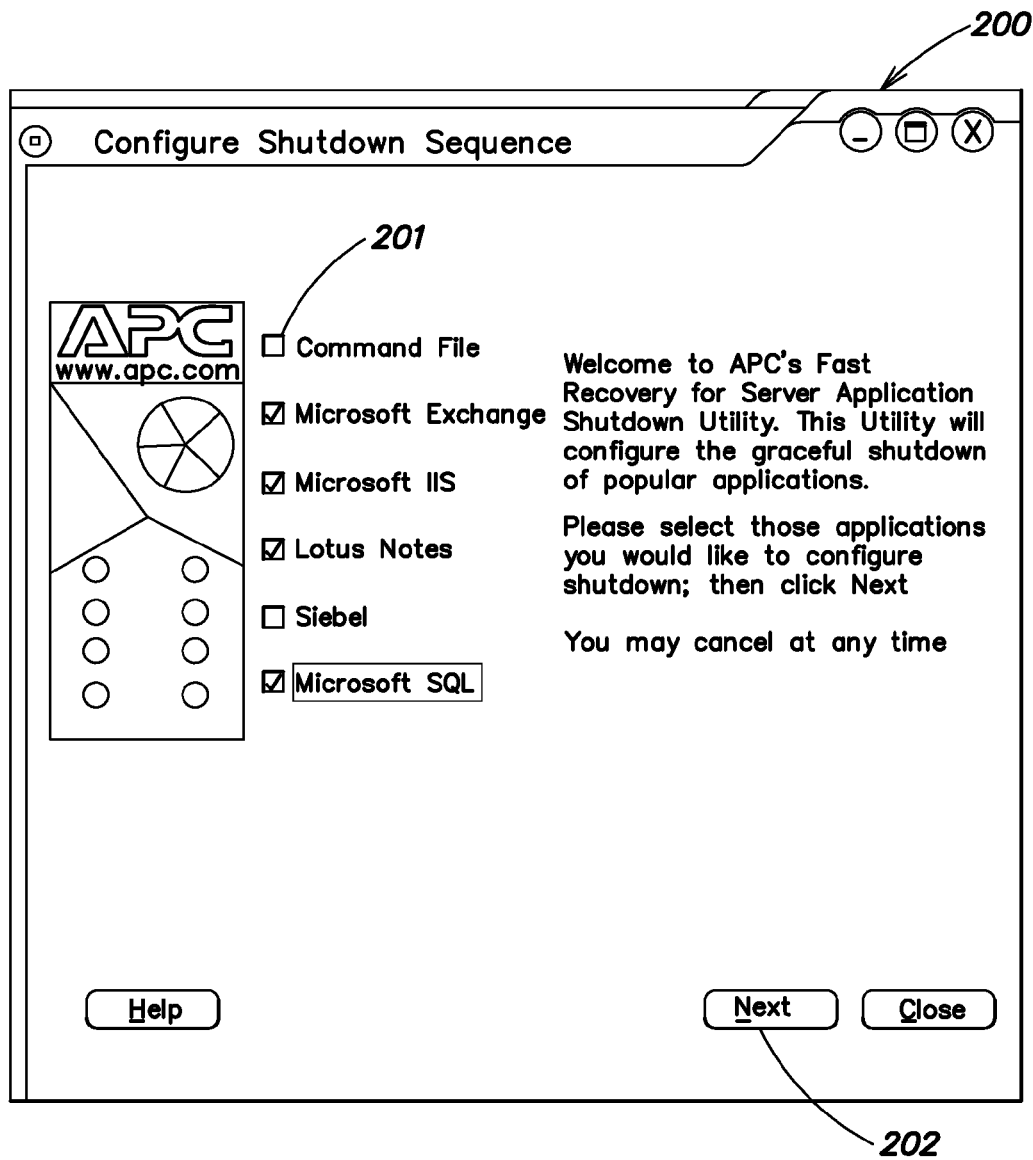
FIG. 2 is a screen shot of a first dialogue window for a configured shutdown sequence wizard illustrating aspects of an embodiment of the invention.

After clicking "Configure Shutdown Sequence" link, a wizard is started whose first dialogue 200 is shown in the FIG. 2. Here, the operator has the option of selecting using check boxes 201 which of the detected applications to shutdown gracefully. The operator also has the option of selecting using check boxes 201 to run the shutdown Command File. In the illustrated example, the operator has elected to configure the Microsoft Exchange server, Microsoft IIS, Lotus Notes server and Microsoft SQL server for graceful shutdown sequencing. The operator then clicks on the "Next" button 202 to proceed with the next dialogue (FIG. 3, 300) of the wizard.

Figure 3:
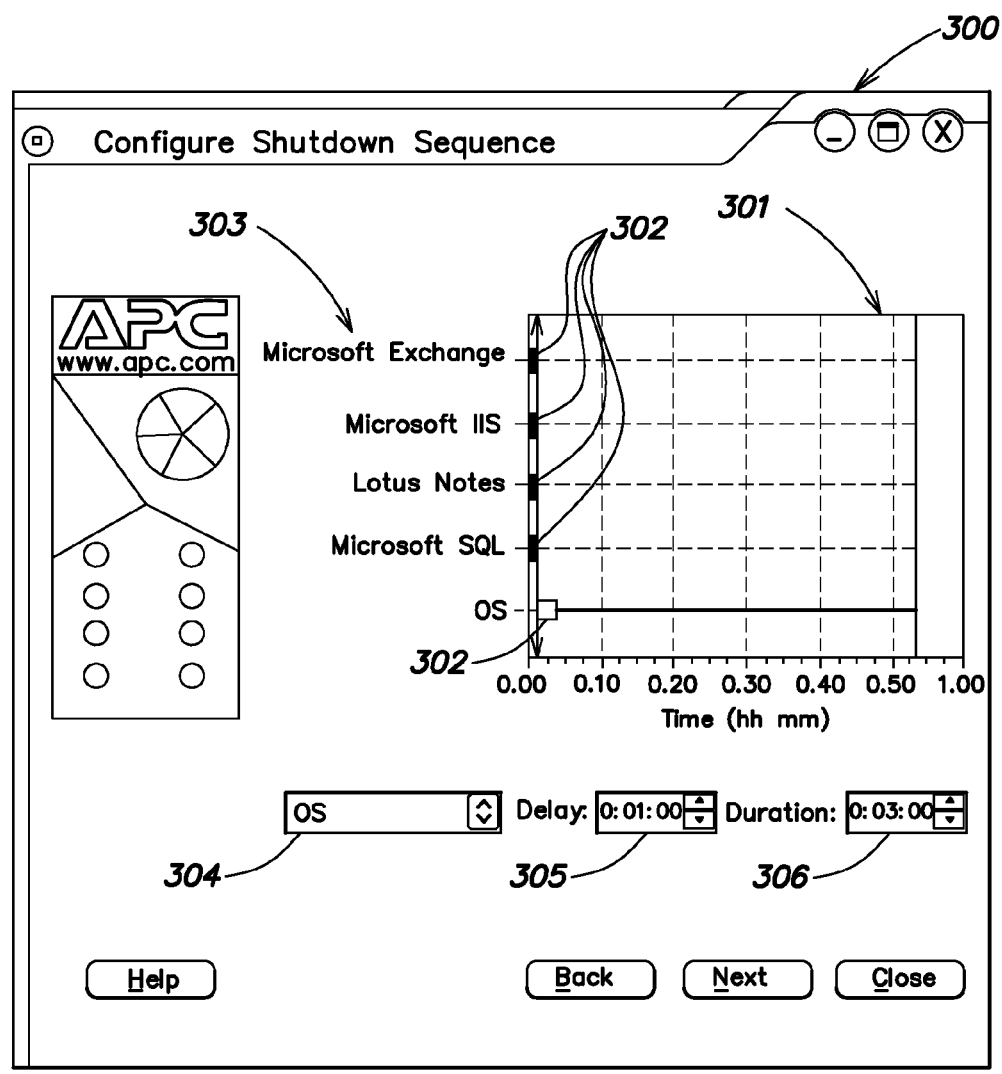
FIG. 3 is a screen shot of a second dialogue window for a configured shutdown sequence wizard illustrating aspects of an embodiment of the invention.

As shown in FIG. 3, the operator is next presented with a graphical, time-line display 301, showing by means of graphical bars 302 adjacent each process name 303, when each process is configured to begin and end its shutdown sequence. The begin and end point of each shutdown time bar is set by use of a graphical pointing device. The display can be programmed to be responsive to clicking or dragging techniques, as known in the art, as well as any other suitable manipulation method. See, for example, selectors 304, 305 and 306.

Figure 4:
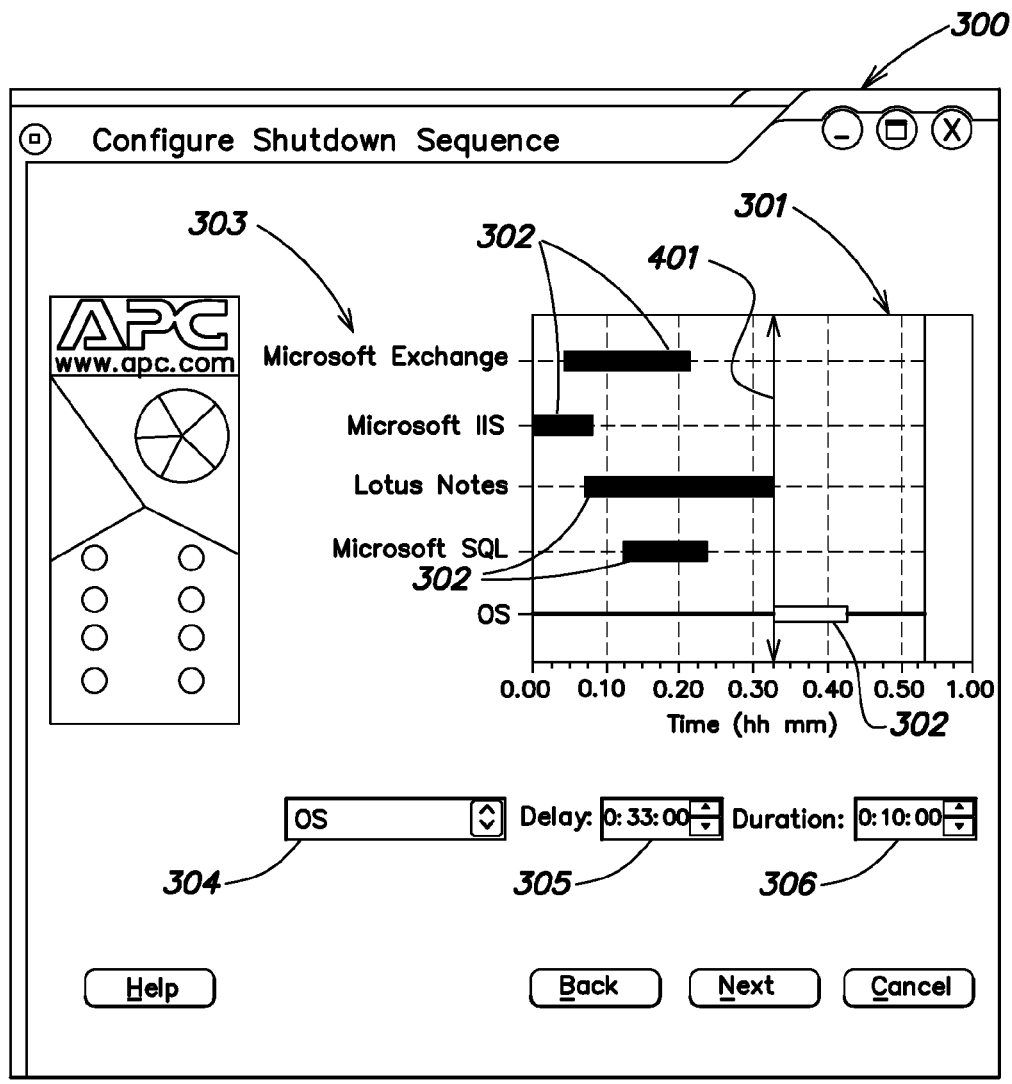
FIG. 4 is a screen shot of a third dialogue window for a configured shutdown sequence wizard illustrating aspects of an embodiment of the invention.

After the shutdown delays and durations have been set for various applications, the time line 301 appears as shown in FIG. 4. Delays and durations are selected by the operator to optimize the graceful behavior during shutdown of each part of the system. Some processes, such as the Operating System, are constrained to begin shutting down no earlier than the end of the last process to shutdown. The time line includes a marker 401 indicating the end of the last process other than the OS to shutdown. According to some embodiments, a constrained process may not be moved to a time which violates the constraint. Constraints can also include times after which a process may not run. An example is discussed in connection with FIG. 5. According to other embodiments, a constrained process may be moved into the impermissible region. However, in such embodiments, then the processes violating the constraint would be flagged in the display, for example, by changing the color in which the process name is displayed.

Figure 5:
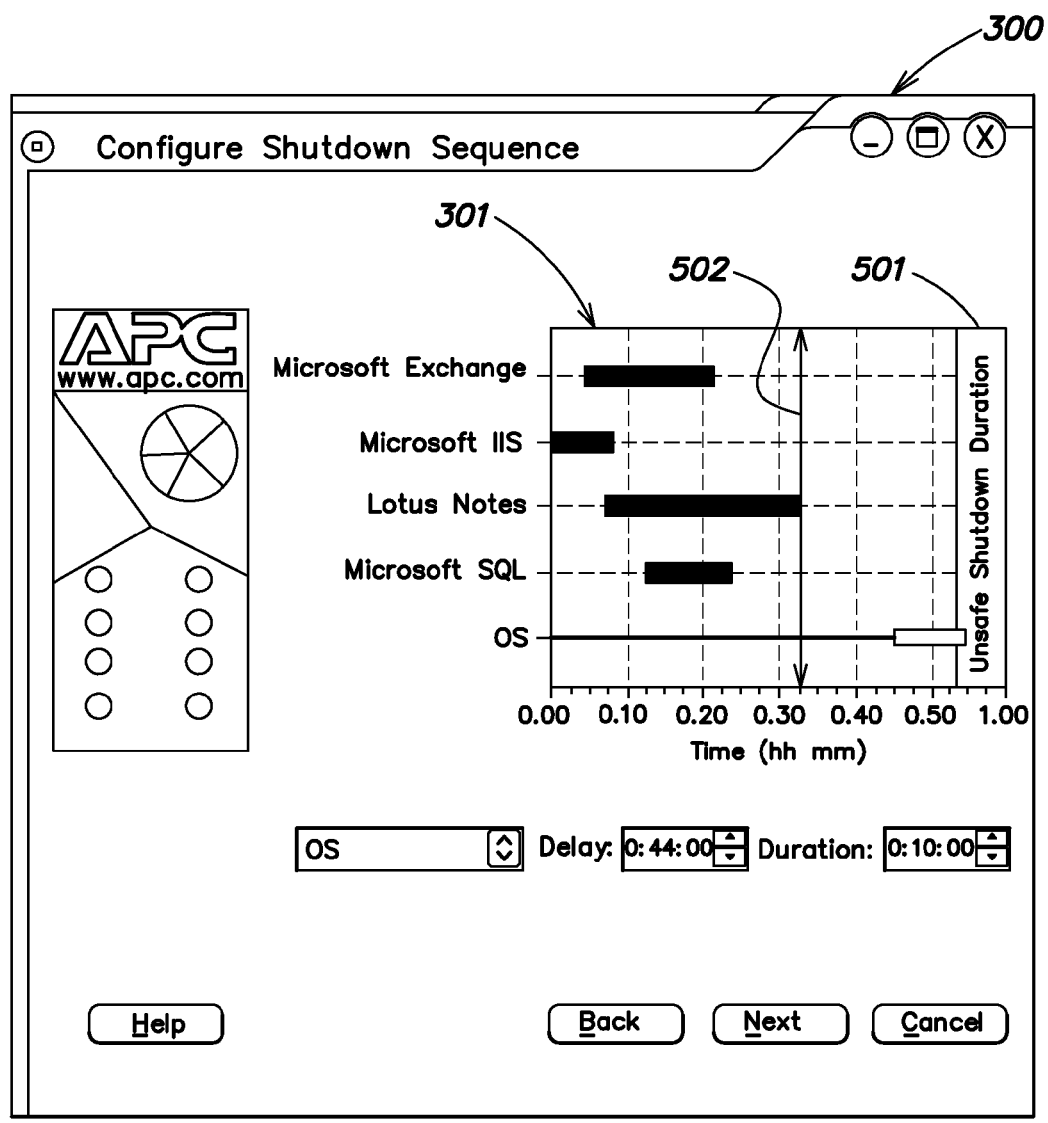
FIG. 5 is a screen shot of a fourth dialogue window for a configured shutdown sequence wizard illustrating aspects of an embodiment of the invention.

One example an impermissible condition, shown in FIG. 5, is when a process is scheduled to shutdown after the end of the safe operating period for the UPS. In the illustrated example, the operating system delay has been increased to a point where the operating system shutdown duration carries the operating system shutdown process into the unsafe shutdown region 501, as shown by the position of time bar 502 corresponding to the OS. As before, constraints can be handled either by simply identifying them in the display or by restricting an operator from creating impermissible conditions.

Figure 6:
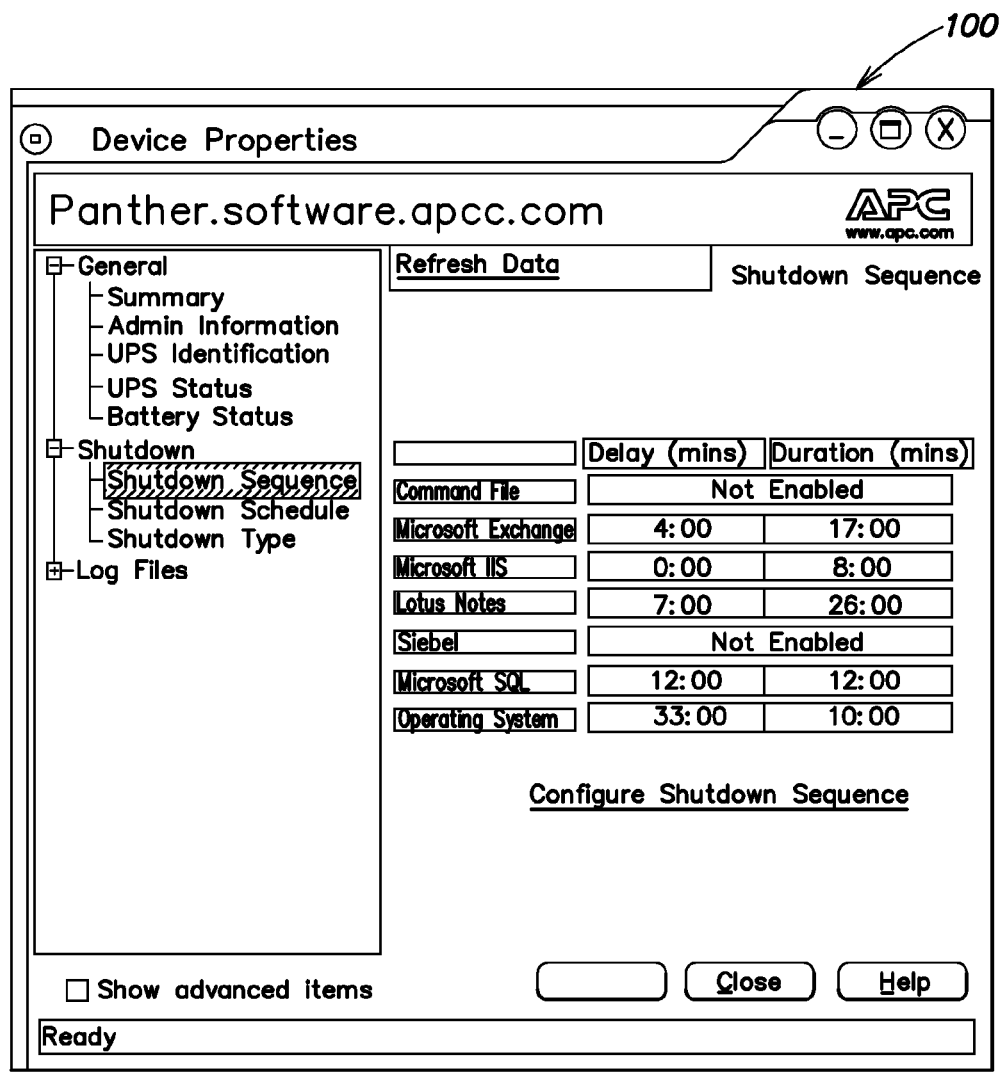
FIG. 6 is a screen shot of the device properties window of FIG. 1, showing the completed result of configuration.

Finally, as illustrated in FIG. 6, after all the shutdown parameters are properly set up, the Device Properties window shows values corresponding to the shutdown sequence of FIG. 4, as configured by the operator.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of controlling a time relative to a trigger event at which a process executing on equipment powered through an Uninterruptible Power Supply (UPS) shuts down, the method comprising:
    providing a graphical display system and a graphical pointing device;
    displaying on the graphical display system a graph having a time axis defining times relative to the trigger event, and a process axis;
    arraying along the process axis indicia of one or more processes which may be executing on the equipment powered through the UPS, and which are to be shut down;
    for at least one process of the one or more processes, displaying a time bar extending from a start point along the time axis to an end point along the time axis;
    setting the start point to a position representing a start time value with the pointing device;
    providing the start time value as a set-point output;
    receiving the set-point; and
    controlling the time relative to the trigger event at which shut down of the at least one process begins shut down, responsive to the received set-point.

2. The method of claim 1, further comprising: ending shut down of the at least one process at a time defined by the end point, relative to the trigger event.

3. The method of claim 1, further comprising: displaying on the graph a constraint on a start point of the at least one process.

4. The method of claim 3, wherein the constraint represents a dependency between an end point of a first of the one or more processes and a start point of a second of the one or more processes restricting a time of the start point of the second of the one or more processes relative to the end point of the first of the one or more processes.

5. The method of claim 3, further comprising: visually identifying the one or more processes on the graph when the start point violates the constraint.

6. The method of claim 3, further comprising: preventing movement of the start point to a prohibited position on the graph relative to the constraint.

7. The method of claim 6, preventing movement of the start point further comprising: when a time between the start point and the end point is fixed, and when another part of the time bar is moved by the pointing device, preventing such movement from indirectly moving the start point to a prohibited position on the graph relative to the constraint.

8. The method of claim 1, further comprising: displaying on the graph a constraint on the end point of the one or more processes.

9. The method of claim 8, wherein the constraint represents a dependency between an end point of a first of the one or more processes and a start point of a second of the one or more processes restricting a time of the end point of the first of the one or more processes relative to the start point of the second of the one or more processes.

10. The method of claim 8, wherein the constraint represents a time relative to the trigger event which end points of all of the one or more processes must precede so as to avoid entering an unsafe operating regions of the UPS.

11. The method of claim 8, further comprising: visually identifying the one or more processes on the graph when the end point violates the constraint.

12. The method of claim 8, further comprising: preventing movement of the end point to a prohibited position on the graph relative to the constraint.

13. The method of claim 12, preventing movement of the start point further comprising:
    when a time between the start point and the end point is fixed, and when another part of the time bar is moved by the pointing device, preventing such movement from indirectly moving the start point to a prohibited position on the graph relative to the constraint.

* * * * *

UNITED STATES PATENT AND TRADEMARK OFFICE
CERTIFICATE OF CORRECTION

PATENT NO. : 7,275,169 B2 Page 1 of 1
APPLICATION NO. : 10/701379
DATED : September 25, 2007
INVENTOR(S) : David M. Aharonian et al.

It is certified that error appears in the above-identified patent and that said Letters Patent is hereby corrected as shown below:

In column 1, line 8, "Uninterruptitible" should read --Uninterruptible--.

Signed and Sealed this

Eighteenth Day of December, 2007

JON W. DUDAS
*Director of the United States Patent and Trademark Office*